(12) United States Patent
Raghoebardajal et al.

(10) Patent No.: US 9,055,267 B2
(45) Date of Patent: Jun. 9, 2015

(54) SYSTEM AND METHOD OF INPUT PROCESSING FOR AUGMENTED REALITY

(75) Inventors: Sharwin Winesh Raghoebardajal, London (GB); Mark Lintott, London (GB)

(73) Assignee: Sony Computer Entertainment Europe Limited (GB)

( * ) Notice: Subject to any disclaimer, the term of this patent is extended or adjusted under 35 U.S.C. 154(b) by 326 days.

(21) Appl. No.: 13/446,263

(22) Filed: Apr. 13, 2012

(65) Prior Publication Data
US 2012/0262485 A1 Oct. 18, 2012

(30) Foreign Application Priority Data

Apr. 15, 2011 (EP) ..................................... 11162624

(51) Int. Cl.
| | |
|---|---|
| G06T 19/00 | (2011.01) |
| H04N 9/76 | (2006.01) |
| G06F 3/01 | (2006.01) |
| G06F 3/0481 | (2013.01) |
| G06F 3/0484 | (2013.01) |
| G06F 3/00 | (2006.01) |
| G06T 7/00 | (2006.01) |

(52) U.S. Cl.
CPC .................. *H04N 9/76* (2013.01); *G06F 3/011* (2013.01); *G06F 3/017* (2013.01); *G06F 3/04815* (2013.01); *G06F 3/04842* (2013.01); *G06T 19/006* (2013.01); *G06F 3/005* (2013.01); *A63F 2300/6045* (2013.01); *A63F 2300/6646* (2013.01); *A63F 2300/69* (2013.01); *G06T 7/0081* (2013.01); *G06T 2207/10016* (2013.01); *G06T 2207/10024* (2013.01); *G06T 2207/20148* (2013.01); *G06T 2207/30196* (2013.01)

(58) Field of Classification Search
USPC .......................................................... 345/633
See application file for complete search history.

(56) References Cited

U.S. PATENT DOCUMENTS

| | | | |
|---|---|---|---|
| 7,583,275 B2 * | 9/2009 | Neumann et al. .............. | 345/633 |
| 2006/0238491 A1 | 10/2006 | Song | |
| 2008/0094398 A1 | 4/2008 | Ng et al. | |
| 2010/0177163 A1 * | 7/2010 | Yang et al. ...................... | 348/45 |

OTHER PUBLICATIONS

Billinghurst M et al: "The MagicBook: a transitional AR interface", Computer and Graphics, Elsevier, GB, vol. 25, No. 5, Oct. 1, 2001, pp. 745-753, XP004318020.
European Extended Search report Applicaiton No. EP 11162624 dated Mar. 2, 2012.
(Continued)

*Primary Examiner* — Xiao M. Wu
*Assistant Examiner* — Steven Elbinger
(74) *Attorney, Agent, or Firm* — Lerner, David, Littenberg, Krumholz & Mentlik, LLP

(57) ABSTRACT

A method of input processing for augmented reality comprises the steps of capturing a video image, generating an augmented image layer for superposition over the captured video image, and for a region of the augmented image layer, detecting for each pixel in the region a property of a corresponding pixel in the captured video image, and mapping with a first mapping the property detected for each pixel of the region back to a reference two-dimensional array of pixels; and generating an input based upon the property values as mapped to the reference two-dimensional array of pixels.

14 Claims, 12 Drawing Sheets

(56) References Cited

OTHER PUBLICATIONS

Robinson J A et al: "The LivePaper system: augmenting paper on an enhanced tabletop", Computers and Graphics, Elsevier, GB, vol. 25, No. 5, Oct. 1, 2001, pp. 731-743, XP004318019.
Peng Song et al: "Vision-based 3D finger interactions for mixed reality games with phisics simulation", International Journal of Virtual Reality IPI Press USE, vol. 8, No. 2, Jun. 2009, pp. 1-6, XP000002658757, ISSN: 1081-1451.
Taejin Ha et al: "Enhancing immersiveness in AR-Based product design", Advances in Artificial Reality and tele-existence lecture notes in computer science;;LNCS, Springer, Berlin, DE, vol. 4282, Jan. 1, 2006, pp. 207-216, XP019051906, IBN: 978-3-540-49776-9.
Tobias Domhan: "Augmented reality on android smartphones", Jun. 8, 2010, XP000002658758, Duale Hochshule Baden-Wuerttemberg Stuttgart, Germany, retrieved from the internet: URL:http://www.softwareforschung.de/fileadmin/softwareforschung/downloads/WISTA/Tobias_Domhan_studienarbeit.pdf.
Bronshtein I.N. et al: "Handbook of Mathematics, 4th ed.", 2003, Springer, Berlin, Germany, XP002669482, pp. 294-296.
Igarashi T et al: "Adaptive unwrapping for interactive texture painting", proceedings of the 2001 symposium on interactive 3D graphics. Research triangle park, NC, Mar. 19-21, 2001; [proceedings of the symposium on inteactive 3D graphics], New York, NY: ACM, US, Mar. 19, 2001, pp. 209-216, XP001113648, DOI: 10.1145/364338.364404, ISBN: 978-1-58112-292-2.
Brett R Jones et al: "Build your world and play in it: Interacting with surface particles on complex objects", Mixed and augmented reality (ISMAR), 2010 9th IEEE international symposium on, IEEE, Piscataway, NJ, USA, Oct. 13, 2010, pp. 165-174, XP031807047, ISBN: 978-1-4244-9343-2.
Grasset R et al: "The design of a mixed-reality book: Is it still a real book?", mixed and augmented reality, 2008. ISMAR 2008. 7th IEEE/ACM International symposium on, IEEE, Piscataway, NJ, USA, Sep. 15, 2008, pp. 99-102, XP031343982, ISBN: 978-4-4244-2840-3.
Xiangyu Wang Ed—Anonymous: "Specifying augmented virtuality systems for creative architectural design", Information visualization, 2007, IV '07. 11th international conference, IEEE, PI, Jul. 1, 2007, pp. 584-589, XP031115735, ISBN: 978-0-7695-2900-4.
Nini B et al: "Virtualized real object integration and manipulation in an augmented scene", computer analysis of images and pattenrs. 11th international conference, CAIP 2005. Proceedings (lecture notes in computer science vol. 3691) Springer-Verlag Berlin, Germany, 2005, pp. 248-255, XP002670127, ISBN: 3-540-28969-0.
Zhuming AI et al: "Integration of georgistered information on a virtual globe", mixed and augmented reality, 2009, ISMAR 2009. 8th IEEE international symposium on, IEEE, Piscataway, NJ, USA, Oct. 19, 2009, pp. 169-170, XP031568927, ISBN: 978-1-4244-5390-0.
European Examination Report for Application No. 11162624.8 dated May 28, 2014.

\* cited by examiner

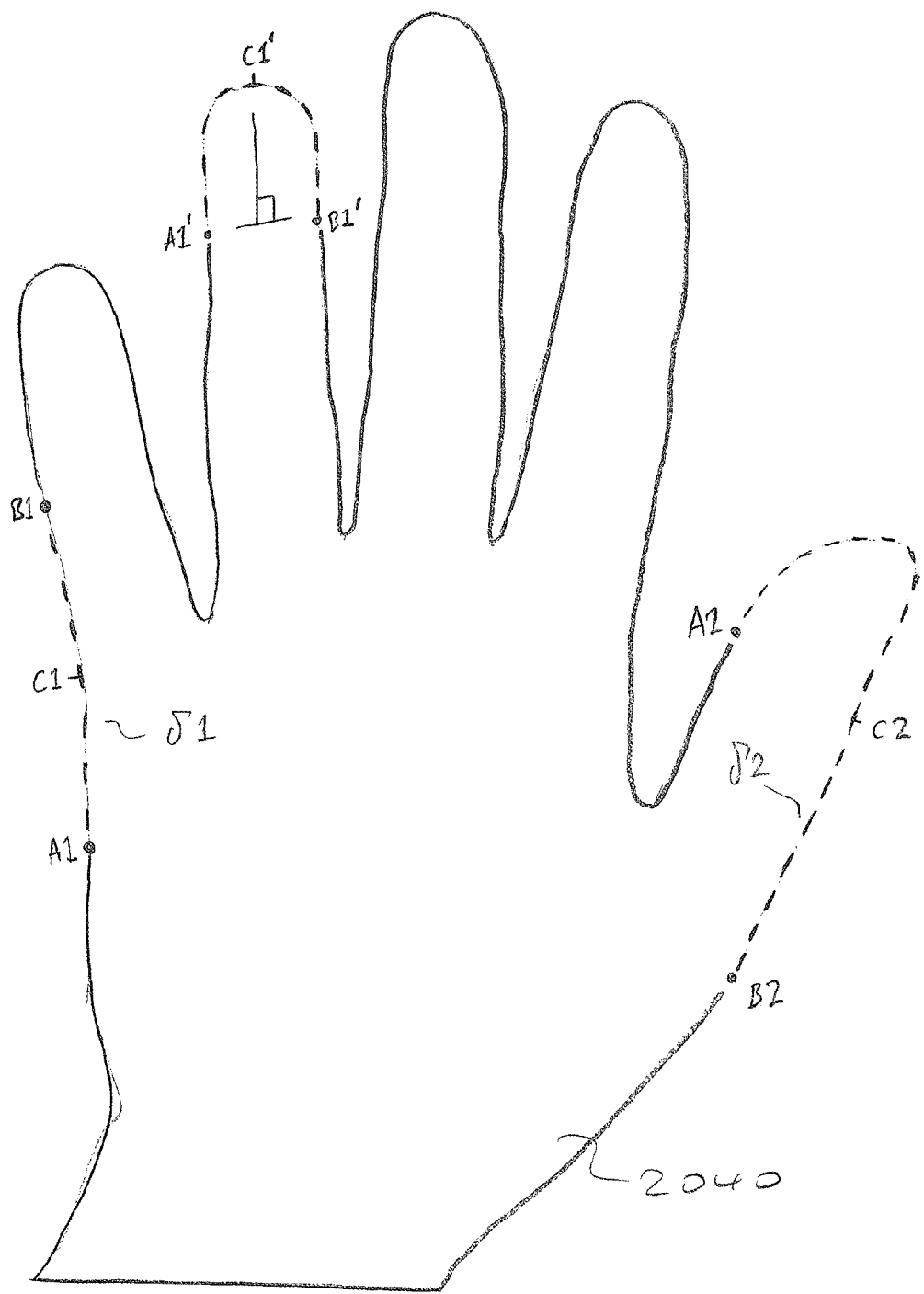

SYSTEM AND METHOD OF INPUT PROCESSING FOR AUGMENTED REALITY

CROSS REFERENCE TO RELATED APPLICATIONS

The present application claims the benefit of and priority to EP Application No. 11162624.8, filed Apr. 15, 2011, the entire disclosure of which is incorporated by reference herein.

BACKGROUND OF THE INVENTION

1. Field of the Invention

The present invention relates to a system and method of input processing for augmented reality.

2. Description of the Prior Art

Recent advances in the capabilities of videogame consoles such as the Sony® Playstation 3® console (PS3®) and other personal computers, coupled with the ubiquity of peripheral devices such as webcams and other cameras such as the Sony EyeToy®, have popularised the use of augmented reality.

Augmented reality, also known as mixed reality, combines live video input with computer graphics to enable a user to interact with an application (typically a game) though hand gesture, facial expression and/or body movement, rather than or in addition to more conventional inputs such as a mouse, keyboard or joypad.

For example, a virtual augmentation of a captured video image may comprise an augmentation image layer, comprising in turn one or more virtual entities. This layer is superposed on the captured video image, thereby combining real and virtual features. In addition, the virtual augmentation may comprise input regions on the augmented image, allowing a user to interact with the image. Typically these inputs are correlated with all or part of one or more virtual entities, but can be correlated with an element of the captured video image, for example using object recognition.

An example of such augmented reality is the well known EyePet® game, where a user interacts with a virtual pet by stroking it, or controlling virtual objects using a so-called fiduciary marker (a hand-held card with a high contrast pattern) or a Playstation Move® controller, which the PS3 can track using the EyeToy, and replace with a further virtual object on-screen. See for example http://www.youtube.com/watch?v=ORYSSQZTzbE.

However, the ability to interact seamlessly with virtual entities is limited by the precision with which the computer or console is able to relate the position of the virtual entity or entities displayed on screen with the position of the user (and in particular the user's hand) in-camera, whilst in practice the user interacts with an empty space. Conversely it is difficult for the user to interact with a virtual entity occupying that empty space if the guidance provided by the on-screen interplay of live video and augmentation is unreliable or inconsistent. Consequently there is clear scope to improve this interaction between users and virtual entities.

The present invention aims to address or mitigate the above problem.

SUMMARY OF THE INVENTION

In a first aspect, a method of input processing for augmented reality is provided as recited in claim 1.

In another aspect, an entertainment device is provided as recited in claim 13.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 12 is a schematic diagram of a multi-touch detection scheme.

DESCRIPTION OF THE PREFERRED EMBODIMENTS

A system and method of input processing for augmented reality are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Figure 1:
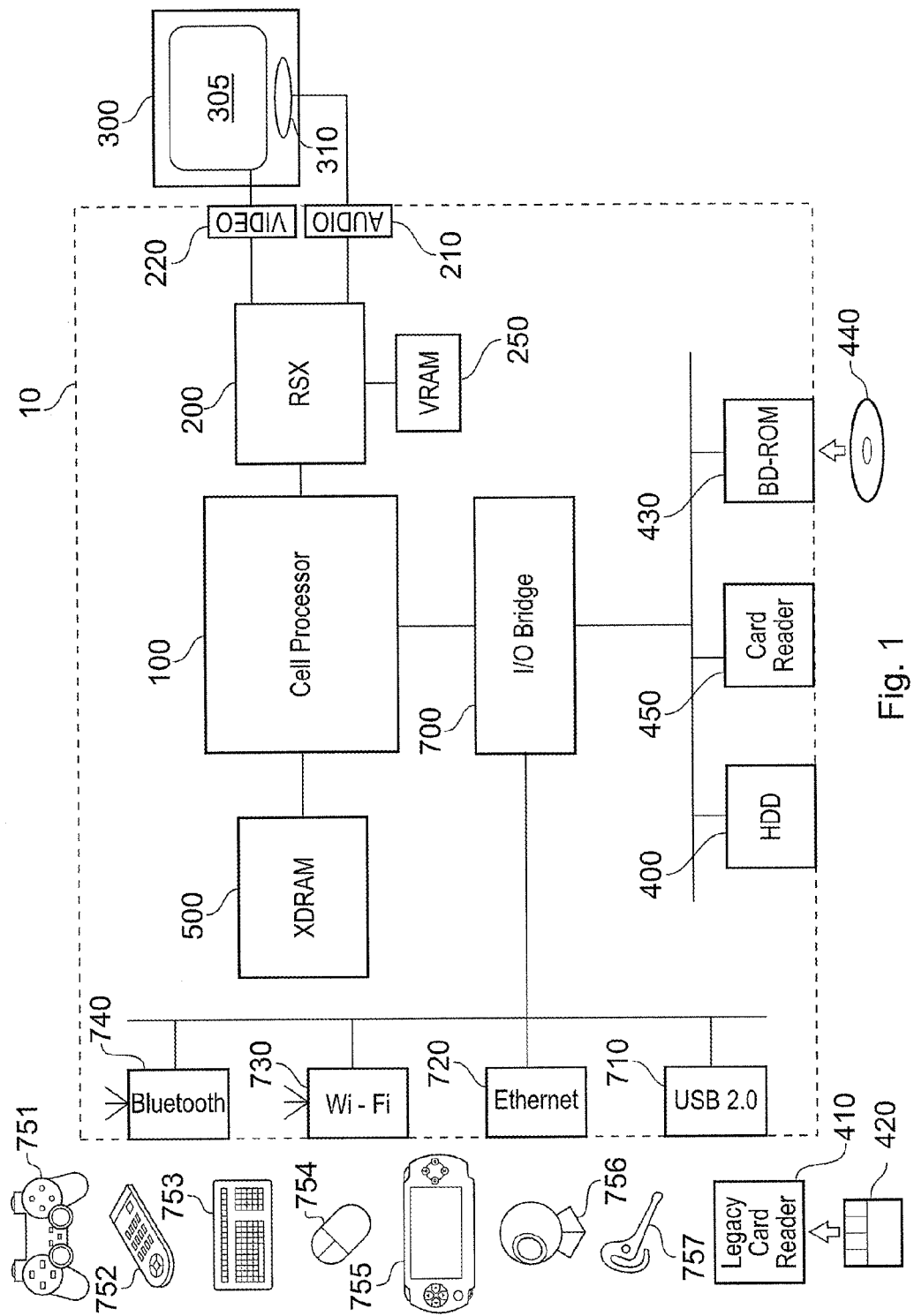
FIG. 1 is a schematic diagram of an entertainment device.

FIG. 1 schematically illustrates the overall system architecture of the Sony® Playstation 3® console or entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections. In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity and inputs for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device or the Playstation Move® may be used as a controller. In the case of the Playstation Portable device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and Playstation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. Similarly in some embodiments the video camera is stereoscopic. In use, images captured by the video camera may for example be incorporated within a game or interpreted to obtain game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

In a typical configuration, the PS3 links with the display and with the EyeToy, typically with the EyeToy being placed near to and either above or below the television, facing towards the user. As a result when the images captured by the EyeToy are displayed on the television, the user is able to face themselves and see their immediate environment when they look at the screen. Typically, the Cell processor 100, the Reality Synthesiser graphics unit 200, or a combination of the two, then operate as the image augmentation means used to add one or more virtual entities in to that environment, with which the user can interact.

Figure 2:
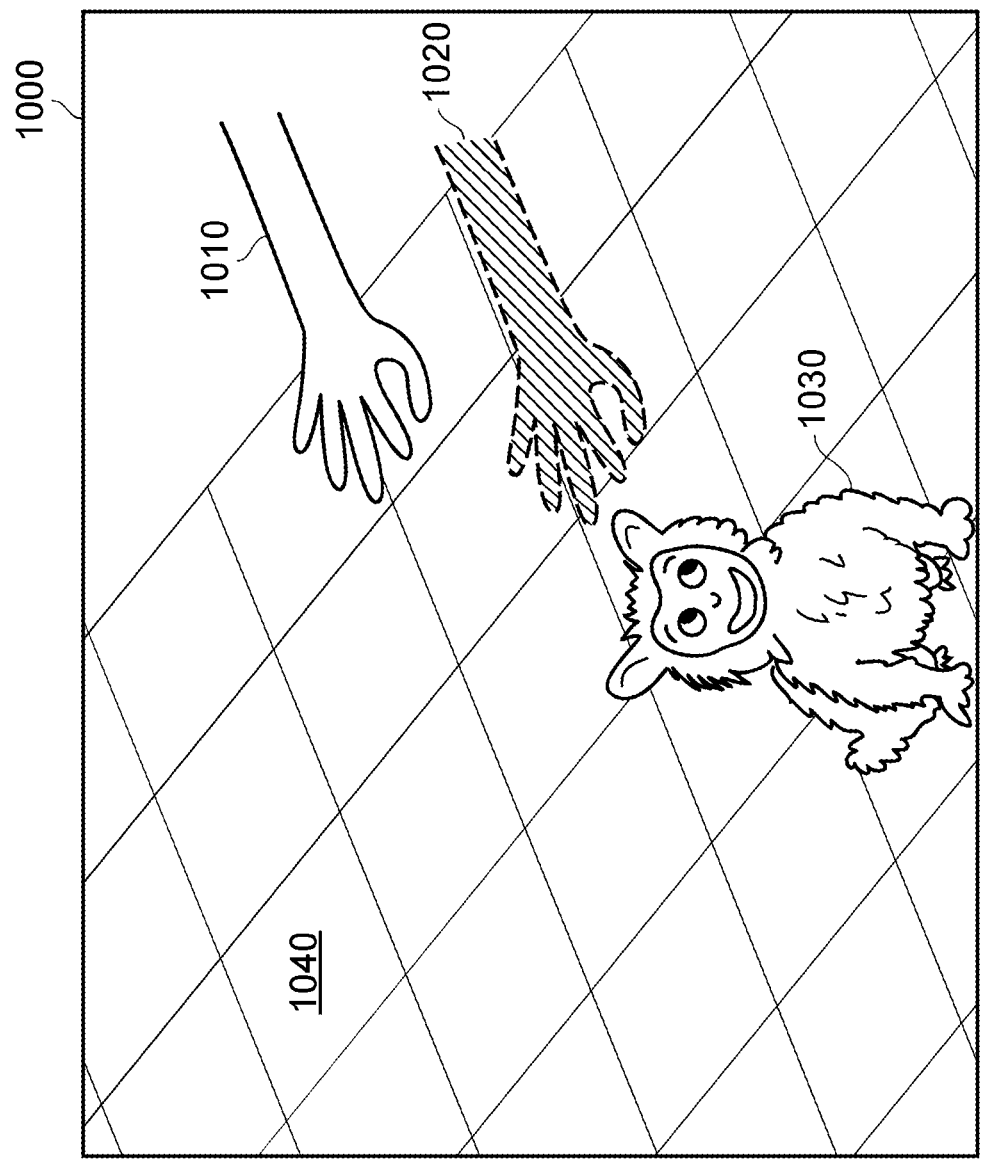
FIG. 2 is a schematic diagram of an augmented reality image.

Referring now to FIG. 2, the interplay between the user and the virtual entities controlled by the PS3 is dependent on several factors, including firstly the accuracy with which the computer can determine where the user (or the relevant part of the user for input purposes) is within the captured video image, and secondly how the interactive parts of the virtual entity relate to the user and the data input mechanisms of the game on a moment-by-moment basis, in order to keep the interaction consistent with user expectations.

FIG. 2 illustrates a typical problem with such interplay. In FIG. 2, a captured and augmented video image 1000 is augmented by a virtual entity 1030. The user, wishing to interact with the virtual entity 1030, moves their hand 1010 to stroke it. However, the shadow 1020 of their hand is visible on the floor 1040, and indeed may be visible within a sequence of captured images before the user's hand itself enters the frame. As a result in this example the virtual entity therefore responds to the apparent stroking action by the user's shadow, which is clearly incorrect.

Given that such augmented reality applications are frequently aimed at children, such unintentional interaction is likely to cause confusion or irritation, particularly if encountered early in play, and could prevent further interactions being sought by the child.

Figure 3:
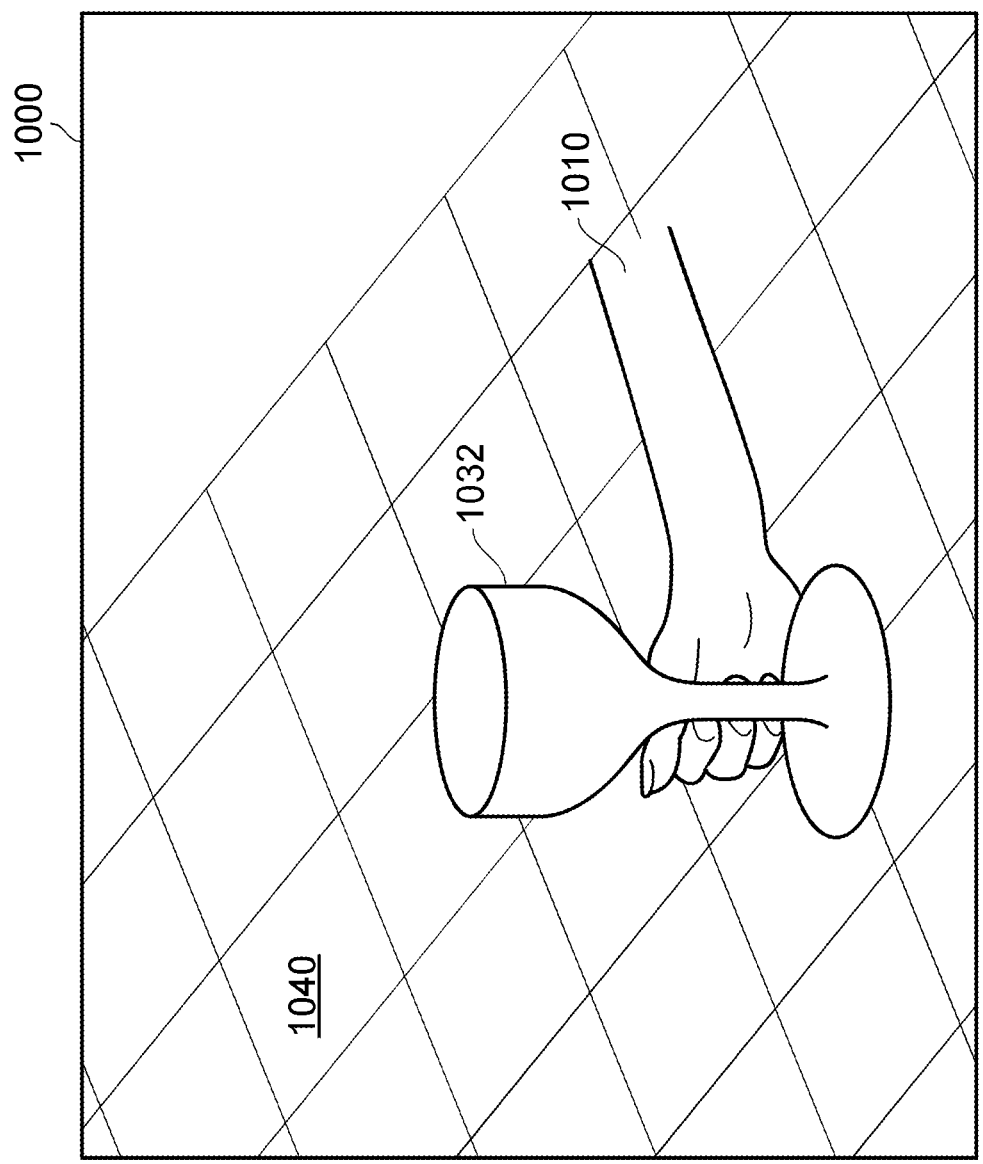
FIG. 3 is a schematic diagram of an augmented reality image.

Referring now also to FIG. 3 (where features in common with FIG. 2 are similarly numbered), another source of confusion for users is that the virtual entities and any other generated computer graphics form one or more augmentation image layers that are superposed on the captured video feed. As a result, objects that one might expect to interact with in specific ways (such as in this case picking up a virtual wine glass 1032) look unnatural because the grasping hand 1010 sits behind the stem of the glass.

To mitigate these problems, the present inventors have developed an approach that in effect works in the opposite fashion to a so-called green-screen; in a green-screen system, a person stands in front of a green screen (or any other predetermined colour background). In the resulting captured image, any part of the captured image that is the predetermined background colour is replaced with a corresponding part of a second image. The effect of course is to make the person appear to be in front of any desired replacement background.

Figure 4:
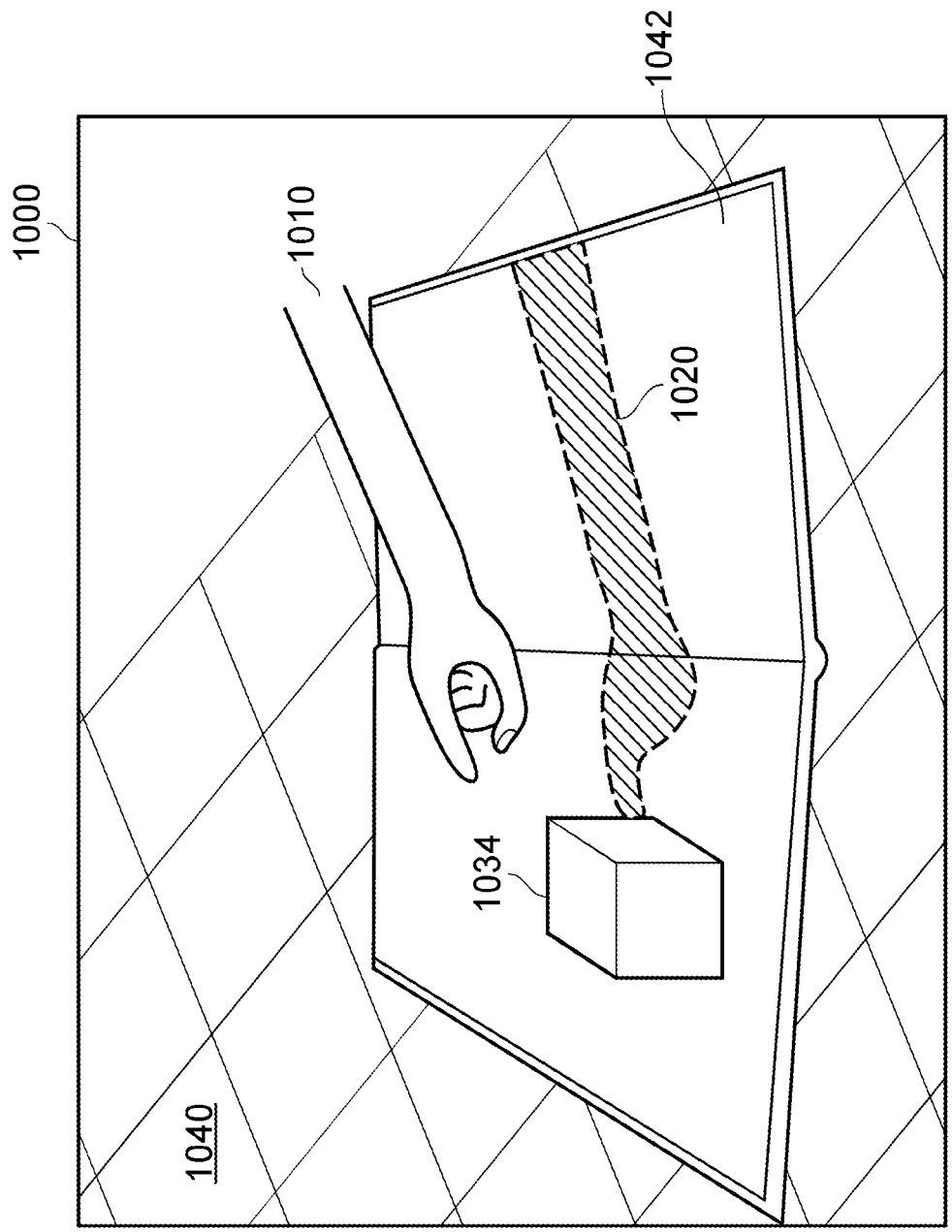
FIG. 4 is a schematic diagram of an augmented reality image.

Referring now to FIG. 4 (where features in common with FIG. 2 are similarly numbered), the present inventors have by contrast appreciated that where an image region has a known background colour that is unlike skin (e.g. green or blue), then it is possible to safely search within that region for all skin tones simultaneously in an aggressive manner.

In FIG. 4, in an embodiment of the present invention, an local background is provided by a book 1042 whose pages are of a non-skin tone such as green or blue, in addition to the environmental background (e.g. the floor) 1040. The pages of the book may contain fiduciary markers (not shown) to enable virtual entities 1034 to be superposed on the book, so creating a 'magic' book where superposed pages 'come alive'. Details of such a book can be found in co-pending application EP10175548.6, which is incorporated herein by reference.

The user may wish to interact with the virtual entity 1034 with their hand 1010, but this again raises the above noted issues of the user's shadow 1020 apparently interacting with the virtual entity first, and the user's hand disappearing behind the virtual entity (which may cause confusion or inaccuracy, particularly where an apparent control or button is displayed on the front of the virtual entity, as will be described later).

To address this, in an embodiment of the present invention, the use of fiduciary markers on the pages of the book, together with known dimensions of the book, can be used to determine from within the captured image exactly where the book is within the image, as is also described in co-pending application EP10175548.6. In summary, this is achieved by comparing the captured image of a fiduciary marker with a reference version of the marker to calculate the distance, rotation and tilt of the marker in the captured image. Given a fixed physical relationship between the marker and the book (i.e. its position on the page) it is then possible to extrapolate the physical position of the book in the captured image.

It will be appreciated that in an embodiment of the present invention it is possible instead to determine the region of the image comprising the book based solely on detection of pixels corresponding to the book pages' known colour or colours, within a predetermined tolerance, and again using known techniques to generate a solid region. However, reliance on colour alone to identify the book may reduce the robustness of the approach in adverse lighting conditions.

In any event, within the region occupied by the book in the captured image it can be assumed that given the colour scheme of the book, any pixels that fall within a wide range of skin tones must belong to the user, as all other pixels will be in the colour tones of the book, as is described in detail below.

In an embodiment of the present invention an image is captured by the EyeToy 756 that comprises, for the purposes of explanation, a scene wherein a user's hand is hovering over the book as in FIG. 4.

The image is then processed by either the Cell processor 100 or by shaders in the Reality Synthesiser graphics unit 200 acting as an image processing means to normalise the values of the red, green and blue ('RGB') colour channels of the captured image. That is to say, for a given pixel of the image, $S=R+G+B$, and the pixel's colour values are then updated to be R/S, G/S and B/S.

This results in an image that preserves the R:G:B ratios of the original image whilst having a uniform brightness level, thereby removing the tonal variations in the image that are due to highlight and shadow.

One benefit of this is that the contrast of the shadow of the user's hand on the book may therefore be diminished by this step, although not necessarily completely removed. The extent to which the shadow is diminished is likely to be dependent on the colour balance of the ambient illumination. If the ambient light is a pure white, then the shadow would normalise to the same colour as the book. However if the ambient light has a colour of its own, then the shadow may well normalise to a different colour than the book. Notably, in front of a television the colour balance of the ambient light is likely to be highly dynamic.

In the normalised RGB image, the Cell processor 100 or Reality Synthesiser graphics unit 200 then tests each pixel for whether it is a skin tone, based upon a first threshold ratio of red to blue values and/or a second, possibly different, threshold ratio of red to green values in the colour channels of the pixel under test. In other words, a pixel is classified as either a skin or non-skin pixel in response to whether the colour balance of the pixel exceeds a predetermined threshold purity of red, in dependence upon the R:B and/or R:G threshold or thresholds. This classification can therefore be used to generate a skin/non-skin mask of binary values.

Because the background colour of the book is designed to generate a very high green or blue pixel value in the captured image, the threshold level(s) as empirically determined can be made very sensitive to a wide range of skin tones from pale white to dark black, all of which comprise a higher proportion of red than the book. That is to say, the threshold level(s) can be set aggressively to encompass a large range of skin tones.

This therefore provides a robust and computationally simple method of detecting the user's skin without the need for any calibration by the user.

Advantageously, because any remaining shadow of the user falls on the book, it too will have a high green or blue channel value and so is very likely to be excluded as a skin pixel.

Figure 5A:
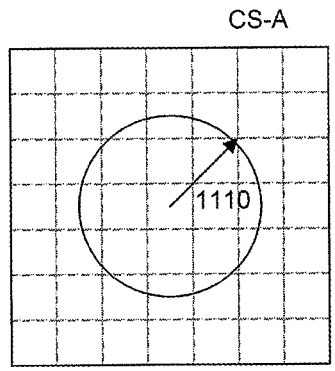
FIGS. 5A and 5B each illustrate a threshold applied to a respective colour space.
Figure 5B:
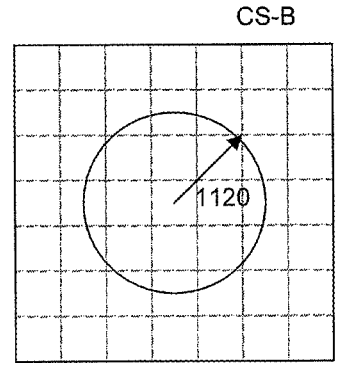
Figure 5C:
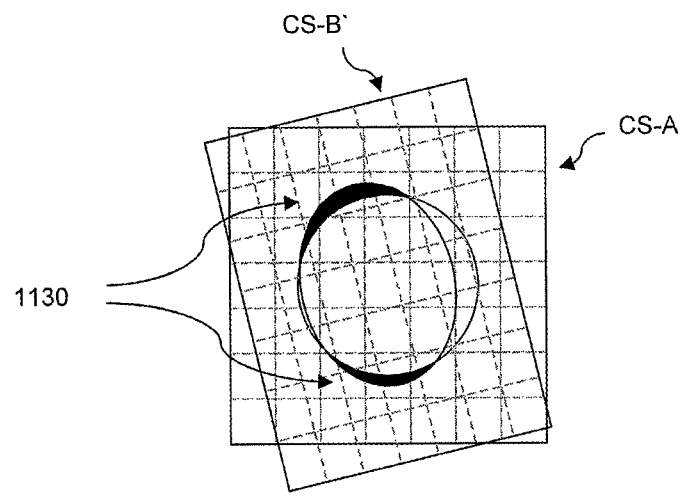
FIG. 5C is a schematic diagram of thresholds applied to respective colour spaces.

Referring now also to FIGS. 5A-C, in an embodiment of the present invention this classification process is performed for representations of each pixel in two or more colour spaces. Example colour spaces include but are not limited to red/green/blue (RGB), Normalised RGB and discussed above, Adobe® RGB, standard RGB (sRGB), hue/saturation/lightness (HSL), and hue/saturation/value (HSV). Many of these colour spaces have a different so-called 'gamut' or range of possible colours, and may also have different relationships between overall colour and colour components.

As a result it is possible to set different thresholds for each colour space that is used in order to capture a yet broader range of possible skin tones from within the original image.

For example FIG. 5A shows a simplified colour space CS-A having, for the sake of explanation, two arbitrary colour dimensions (e.g. x and y) and a central origin. A threshold ratio between the colours 1110 may thus be used to define a range of colours assumed to be skin (e.g. inside the circle) as against those not skin (e.g. outside the circle). FIG. 5B shows a second simplified colour space CS-B having its own two colour dimensions and its own threshold ratio 1120. For the purposes of explanation, the chosen threshold ratio is the same in both FIGS. 5A and 5B, but in principle respective ratios for different colour spaces (and between different colour channels in such spaces) may be used.

However, as seen in FIG. 5C, if one were to map the colour space CS-B onto the colour space CS-A, then (ignoring here for simplicity any losses due to differences in gamut, represented here by those parts of mapped colour space CS-B' lying outside the area of colour space CS-A) it will be seen that the combination of thresholds in 5A and 5B result in an area defined as representing skin colour that is greater than that found in either colour space alone, as identified by the shaded regions 1130 of FIG. 5C that extend beyond the threshold circle of CS-A.

It will be therefore be clear from FIG. 5C that in an embodiment of the present invention, a skin classification in any one colour space takes precedence over a non-skin classification in another colour space. In practice this can be achieved by applying an OR operation between skin masks generated for each colour space used.

This approach is likely to be of benefit for identifying edges of the user's hand, where highlights and shadows are likely to be at their most extreme, or where colour blending with the immediate background by the image capture device has occurred. It is also likely to be of benefit when there is a strongly coloured light source illuminating the user's skin, such as for example light from the relatively close television.

In any event, once a pixel has been classified as either skin or not skin, then applying the convention of a '1' for a skin pixel detected in this manner and a '0' for all other pixels, a binary image skin mask can be generated based upon the classification of the pixels of the captured video. In this regard, again the Cell processor 100 and/or Reality Synthesiser graphics unit 200 can operate as the mask generating means.

This mask can be post-processed using known techniques, for example to remove small groups of non-skin pixels below a predetermined area or radius that are surrounded by skin pixels. Conversely false-positive noise may be reduced by removing small groups of skin-pixels below a predetermined area or radius that are surrounded by non-skin pixels. Other techniques for unifying regions of an image will be apparent to the skilled person.

Usage of this skin mask is described later.

With a pair of respective skin masks from two successive frames of a captured video image sequence, it is possible to identify motion between them. For example, a per-pixel XOR operation between the two masks will generate a skin motion mask responsive to where a pixel has changed between skin and non-skin categorisations in the two skin masks.

This motion data may be used in a number of ways. For example, a summation of the skin motion mask binary values may be used as a simple indicator of the user's kinetic energy in the captured image, although it will be appreciated that more sophisticated motion modelling techniques may be used if desired. Similarly, a summation of skin motion mask binary values within a specific region of the mask may be used as a local indicator of kinetic energy, for example to trigger a control if the energy exceeds a threshold. Such control mechanisms will be described later. Thus more generally, the pixels of the skin motion mask may be considered as input data pixels used to evaluate a user's excitation of an input region, as discussed in more detail later.

Alternatively or in addition, the skin motion mask may be used to guide a second pass of the skin mask generation process.

In an embodiment of the present invention, a first skin mask is generated for a captured image as described above, using one colour space. In conjunction with the skin mask for the preceding captured image, a skin motion mask is generated as described above. As noted above, this mask represents areas of transition in the image and so, as also noted above, are likely to contain areas of skin having strong highlights or shadows. Therefore, using this mask (or a processed version of it expanding the motion regions using well known techniques such as dilation), only those areas of the image in which change has occurred are subjected to analysis using one or more further colour spaces to expand the classification of skin pixels. This can reduce the computational load of the analysis whilst largely maintaining the advantage of using multiple colour spaces.

Similar approaches to reduce computation load include only processing those pixels of the image corresponding to the book and the virtual entity or within a threshold distance of them, or more generally only processing a relevant subregion of the captured video. Other strategies will be apparent to a person skilled in the art.

Whilst the above techniques have been described with respect to a book, in principle it can be applied to any background. Thus more generally, one may provide any physical object having similar colour properties to the book described above (i.e. a predetermined colour that would be classified as not-skin by the above classification techniques). The PS3 will typically be arranged to generate an augmentation layer for the resulting captured image that places a virtual entity over the object, typically in response to fiduciary markers in the object or in response to object recognition. Consequently, where the background is a predetermined colour (e.g. due to a blue playmat), the skin pixel classification will be similar to that described above.

However, it is also possible to apply the technique to arbitrary backgrounds as follows. In the case of a fixed camera, and hence a fixed environment (such as a user's room), a dynamic threshold for the purity of red used to identify skin tones can be generated. In an embodiment of the present invention, a threshold map can be built to generate a per-pixel R:G and R:B threshold or threshold pair to be used when generating the skin mask for that pixel; In an embodiment of the present invention, after asking the user to vacate the region of image capture, the R, G and B values of each pixel in a captured image are measured and a threshold R:B and R:G ratio calculated for each pixel that occurs at a predetermined absolute or relative distance from the calculated R:B and R:G ratios of the background. If there is significant noise from the image capture device, then mean and variance values for each pixel over a series of successive captures can be used to set the thresholds, lying for example one or two standard deviations from the mean colour value. In this regard, the PS3 can also rapidly display a range of colours on the TV screen during this capture period to generate ratios that take account of changes to the ambient light caused by the TV. In this way, where a background pixel is very different from skin colours, then the default threshold value(s) for classifying skin pixels can be used, but where a back ground pixel has a colour similar to a skin tone, then a calculated threshold can still identify that subset of skin tones that remain distinguishable from the background. In this way a large range of skin tones can still be identified over the whole image.

As an optional refinement, a further lower threshold may also be provided to each colour channel to exclude pixels whose red purity is too high (for example to account for when there happens to be a genuinely red object present in the background). Thus more generally, where a background pixel has a colour balance ratio that lies within the range normally classified as skin, then a classification exclusion around that ratio can be applied to that pixel using upper and lower threshold ratio values. As a further optional refinement, these pixels can be identified (for example using a further mask) and more aggressive post processing can be used to repair corresponding misclassified areas of the skin mask; for example when evaluating whether to remove a small group of non-skin pixels of less than a predetermined area or radius that are surrounded by skin pixels, the predetermined area or radius can be larger if there is a threshold proportion of such background pixels within the small group.

Having obtained a skin mask by one of the above described techniques, the PS3 can now mitigate the problems of shadow and object order identified in relation to FIGS. 2 and 3 above.

Figure 6:
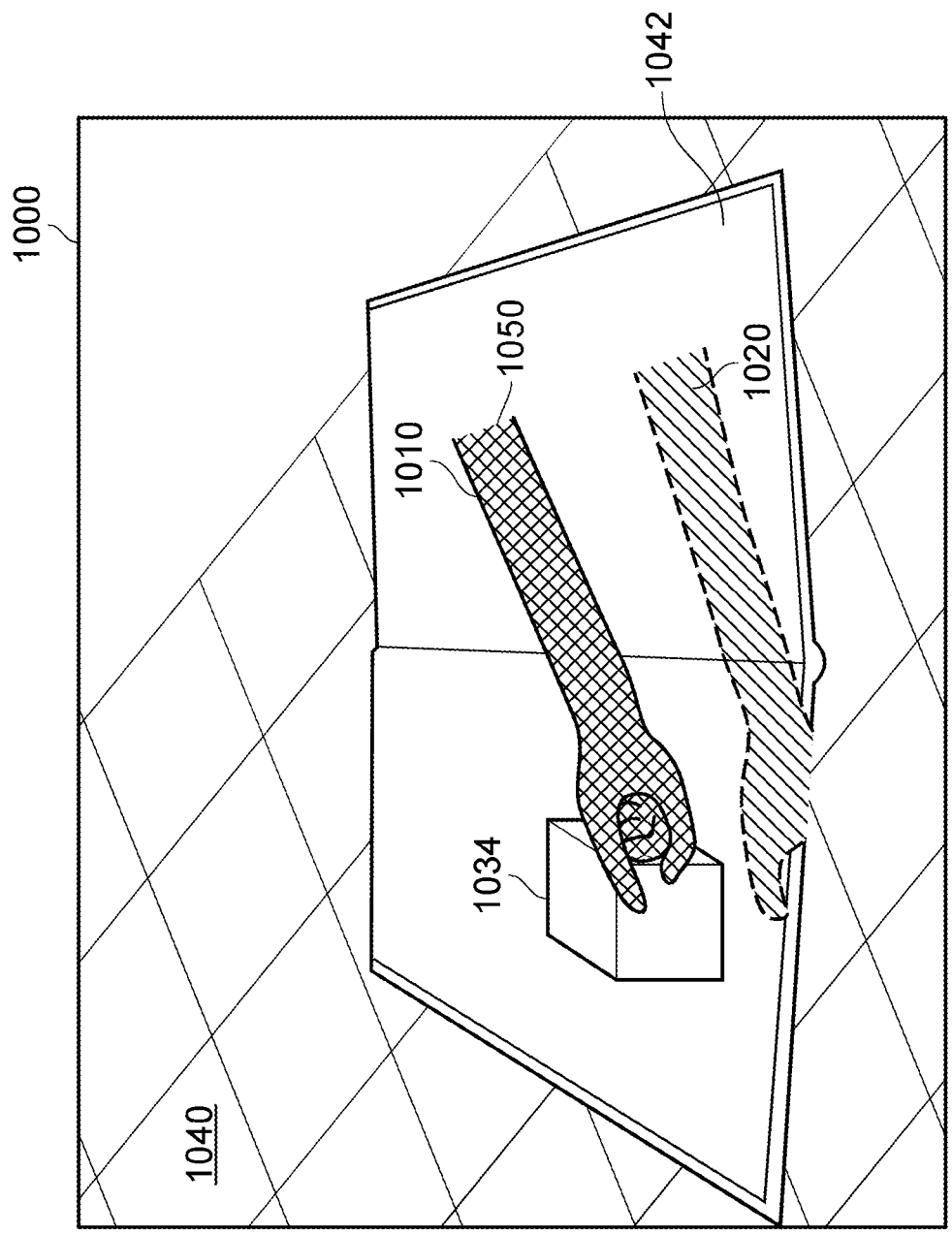
FIG. 6 is a schematic diagram of an augmented reality image.

Referring now to FIG. 6 (where features in common with FIG. 4 are similarly numbered), then following on from FIG. 4, in this example the user has now notionally touched the front of the virtual entity 1034. However, the skin mask 1050 is now employed to mask out or mask off those elements of the augmentation image layer comprising the virtual entity that coincide with the user's skin, with the result that the virtual entity appears to sit on top of the book, but behind the user's hand. As such the skin mask is used as an augmentation layer mask to control the or each augmentation image layer superposed on the captured image. In this way, the displayed image of the augmented video retains the pixels displaying the user's hand whilst the virtual entity appears to reside within the captured scene, rather than just lying on top of it.

A simple z-buffer scheme for the user's hand and a virtual entity can be implemented by asking the user to touch points at the front and rear of the book and measuring various parameters indicative of hand size at each point (e.g. apparent wrist span, index finger length, or skin area, etc). The size of the user's hand in the image and/or skin mask is then a rough estimate of distance that can be used to decide if the hand should be left behind a virtual object or displayed in front of it as described above. Tracking and smoothing algorithms for such detection are known in the art and so are not discussed further here. Similarly, anti-aliasing and other image layer blending techniques that may be used to better integrate the user's hand and the virtual entity are known in the art and are not discussed further here.

In addition, as noted above the shadow of the user's hand is not likely to be identified as skin within the skin mask.

Therefore to substantially avoid interaction between the user's shadow and virtual entities, the skin mask (and/or where appropriate, the skin motion mask) can also act as an input or interaction mask so that only the user's hand (or other suitable body part) can interact with the virtual entities, either statically or through motion.

Thus in an embodiment of the present invention, one may specify an input region of pixels on the augmented and/or captured video image, for example using an input region binary mask, and use the skin mask to mask part of the input, thereby retaining an input region of pixels of the augmentation image layer corresponding to pixels in the captured video that are classified as skin pixels. For example, the input region mask could be combined with the skin mask using an AND operator. This may be interpreted either as masking out pixels of the input region that correspond to non-skin pixels, or masking in pixels of the input region that correspond to (i.e. overlap) skin pixels. The two interpretations are considered equivalent.

Thus more generally, in response to the mask the PS3 can limit a mode of combination of the captured video and an augmentation image layer of the captured video, for example in a first mode by masking out the augmentation image layer to retain user skin pixels, with or without a z-buffer, and/or in a second mode by masking input regions of the augmentation layer, as described above; in other words, the PS3 can limit how the graphics are combined from the captured video and augmentation image, and/or how input data is combined from the captured video and augmentation image.

Finally, it will be appreciated that for a 3D (stereoscopic) system using a stereoscopic video camera and display, the above techniques can be applied to both left and right captured or augmented images as applicable, or conversely applied to one captured or augmented image and transposed to the other captured or augmented image using information relating to the stereoscopic separation of these images.

Figure 7:
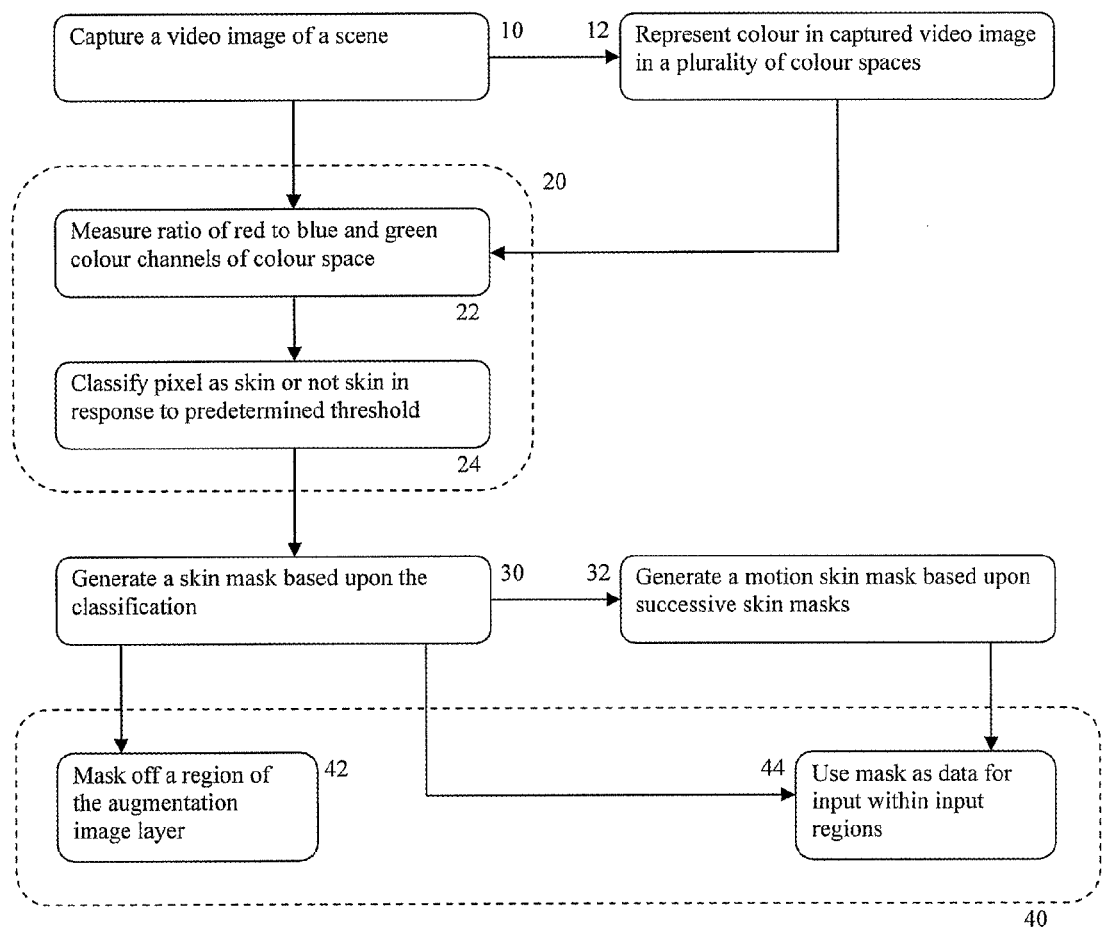
FIG. 7 is a flow diagram of a method of user interaction.

Referring now to FIG. 7, a summary embodiment of a corresponding method of user interaction comprises:

in a first step 10, capturing a video image of a scene;

Optionally in a second step 12, representing the scene or a part of it using a second or further colour space as described previously;

In a third step 20, classifying the pixels in each used colour space by, in a first sub-step 22, measuring the ratios of red to blue and green (i.e. the purity of red) in each pixel to be analysed, and in a second sub-step 24, classifying the pixel as skin or not skin in response to a predetermined purity threshold or thresholds;

In a fourth step 30, generating a skin mask based upon the above classifications, combining them where applicable from several colour spaces as described previously;

Optionally in a fifth step 32, generating a skin motion mask based upon successive skin masks as described previously; and In a sixth step 40, limiting a mode of combination of the captured video and a virtual augmentation of the captured video responsive to the skin mask, for example optionally in the form of a first sub-step 42 of masking off a region of the augmentation image layer as described previously, and/or a second sub-step 44 of providing only pixel data from the skin mask and/or skin motion mask as input data to an input region of the augmented image.

It will be apparent to a person skilled in the art that variations in the above method corresponding to operation of the various embodiments of the apparatus and to the various embodiments of the techniques as described and claimed herein are considered within the scope of the present invention.

Operation of the input regions is now discussed in more detail with reference to FIGS. 8A and 8B.

It will be appreciated that with an improved visual feedback provided by the above skin identification and masking techniques, users will expect improved accuracy and/or granularity of input control. Thus for example, if the user can now consistently see their finger in front of a virtual entity, they may expect to have fingertip control of that entity rather than a more vague notion of interaction within an area corresponding to that entity.

Figure 8A:
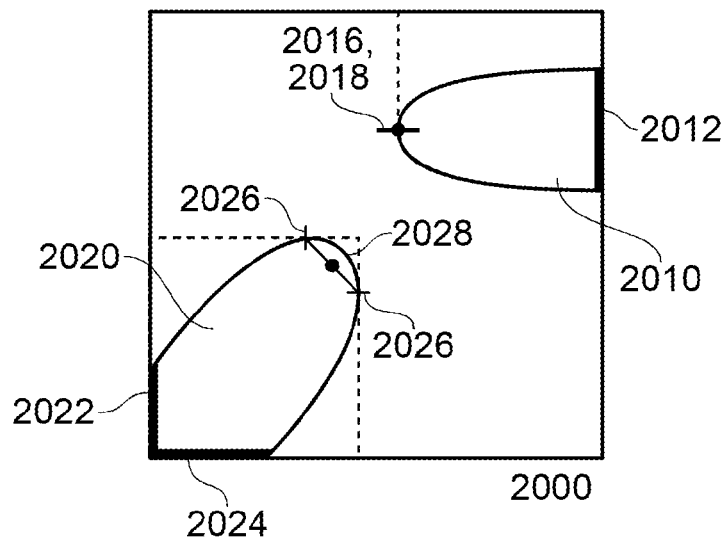
FIGS. 8A and 8*b* each show an input region of an augmented reality image.

In FIG. 8A, an input region 2000 associated with part of the augmented image has been accessed by the user, as represented here by two fingers 2010 and 2020. The first finger 2010 has entered the input region on only one edge at a position 2012. Consequently a reasonable approximation of the user's finger tip (2016, 2018) is to find the pixel in the skin mask horizontally furthest from the edge of entry within the contiguous block of skin pixels starting at position 2012. Similarly if the first finger had entered the region from above or below then the furthest vertical distance would have been used. Thus the fingertip position is estimated based upon where the finger enters the input region, i.e. in response to an interaction between the skin mask and an input region mask.

Consequently, where a finger such as a second finger 2020 enters the region from both horizontal and vertical edges (i.e. in a corner) at positions 2022 and 2024 then within the contiguous block of skin pixels entering the region, the horizontally and vertically most distant pixels 2026 in the skin mask are found, and their positions are averaged to approximate the fingertip position 2028.

This approach generates a reasonable approximation of fingertip position except where the user's finger enters the corner of an input region at too shallow or steep an angle.

Figure 8B:
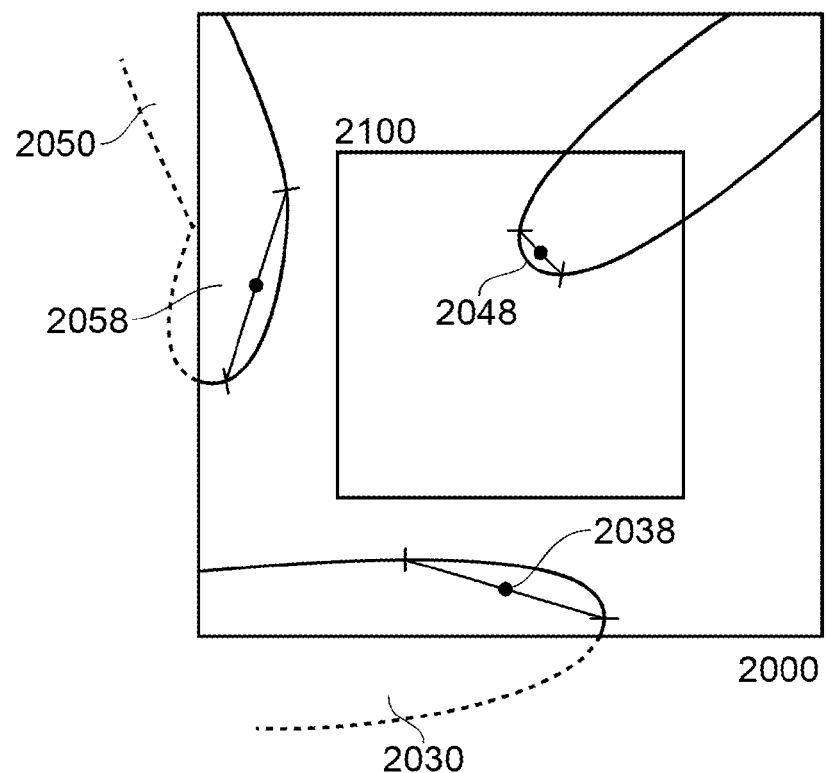

Referring now also to FIG. 8B, to address this problem the input region can be separated into an outer and inner region; the outer region 2000 operates as before to approximate fingertip position, but inputs based upon fingertip position are only used if they are within the inner region 2100. Put another way, estimated fingertip positions that are not within the inner region 2100 are discarded as unsuitable for further parsing as a valid input. It will be appreciated that the estimated fingertip positions 2038, 2058 of two fingers 2030, 2050 in FIG. 8B are likely to change drastically in response to small movements of the user because either the horizontal or vertical extent of the finger becomes effectively random (or disproportionate to actual movement) as the fingers respectively approach vertical or horizontal. However as this happens, the fingers therefore move outside the inner region 2100, so removing themselves as inputs. The effect is that within the inner region 100 the user only experiences reasonably consistent approximations of fingertip position. Of course, the displayed virtual graphics and the inner and outer regions can be arranged so that the user is invited to interact with controls coincident with the inner region, for example, by depicting a switch within the inner region only.

Alternatively or in addition, referring now to FIG. 12, in an embodiment of the present invention a multi-touch detection scheme is based upon an analysis of the skin mask. In practice, the scheme may be implemented by the Cell processor.

FIG. 12 shows (for the purposes of clarity) the outline of a skin mask 2040. In addition, it shows trio of edge tracking points A1, B1, C1, where A1 and B1 define the ends of a notional edge tracking line of length δ1, with C1 at its midpoint. The three points then progress along the edge of the skin mask using a known edge tracking technique.

In due course the edge tracking points reach the positions illustrated by A1', B1' and C1'. These positions illustrate that when traversing a fingertip, there will come a position where the midpoint C1' is perpendicular to a baseline drawn between points A1' and B1'. This can be detected using the dot product A1'C1'•B1'C1', or any suitable geometric test.

When so detected, then midpoint C1' indicates the location of the fingertip, and the line perpendicular to the baseline is the direction in which the finger is pointing.

The joins between fingers at their base will also produce a similar positioning of the trio of points, but can be distinguished by having a dot product of opposite sign.

Hence more generally, the scheme tracks the edge of the skin mask with a trio of equidistant points spanning a first predetermined length, and detects when the middle point is positioned perpendicular to a line between the end points, and consequently estimates the position of a finger tip as being the position of the middle point and the direction of the finger as being perpendicular to the line between the end points.

Notably however, one or more additional trios of points can also track the edge of the skin mask, each with a different respective notional length or spatial frequency. For example the trio A2, B2, C2 is of a greater length δ2 (i.e., has a longer spatial wavelength) than the trio of A1, B1, C1. Having a plurality of edge tracking lines of different lengths or spatial frequencies improves the detection of hands of different sizes (such as a child's or an adults) and also enables the averaging of estimates for fingertip positions based on different positions for A and B on a finger, thereby potentially improving accuracy and/or reducing jitter in the estimate over successive frames.

Thus as one or more trios of points traverse the edge of the skin mask, they will identify the location of the tip and the direction of each resolvable digit of the user's hand. This information can then be used as input to any suitable control by the PS3.

Such controls and their operation are now described in more detail.

Historically, due to relatively crude control and visual feedback in augmented reality applications, there has been little motivation to provide control interfaces that are more than just two-dimensional regions of the screen, typically squares and rectangles.

Within these two-dimensional control regions, however, a number of input modalities can be considered, including but not limited to the following:

i. a simple switch; if a threshold level of motion is detected within consecutive captured images of the control region, the state of the switch is flipped.
  ii. a simple button: if a threshold proportion of the control region is occupied by the user (e.g. the skin mask), the state of the button is flipped.
  iii. a simple slider: if the motion or occupation by the user progresses in a predetermined direction within the control region, an output value increments or decrements as appropriate.
  iv. a simple dial: similar to the slider, but with arcuate motion.
  v. a simple virtual mousepad: rather like a two-dimensional slider, the co-ordinates of the user's fingertip or some other trackable feature of the captured image are provided as an output.

vi. an energy switch; if a threshold sum of motion values is accumulated within a set number of captured image frames then an output state is switched. The switch may provide feedback on the current sum of motion values so that the user knows whether to increase or decrease their motion. A variant is to threshold a rolling average of motion values. In either case, a constant per-frame decrement to the sum or average may be applied to bias the amount of motion and hence energy or effort required by the user to trigger the switch.

vii. A velocity input; similar to a slider, but alternatively or in addition the velocity (and/or acceleration) of the user's motion is detected.

Other input modalities may be apparent to a person skilled in the art. Typically the Cell Processor acts as an input parsing means to parse these input modalities in order to generate inputs for various data processes, typically games.

As noted above, all these inputs assume the presence of a two dimensional input control region of predetermined size in order to work.

However, it is desirable to have regions of the augmented image layer operate as control interfaces that behave as if they are properly part of the augmented environment; for example if one face of a poseable cube shows a control interface, then the shape and area of the region of that control interface should be dependent upon the position and orientation of the cube in a 3D virtual space, and should not be a fixed rectangle. Similarly, the region occupied by a control interface on a creature such as the EyePet should be mutable in response to the actions and poses of the EyePet. One will appreciate that maintaining consistent function of these controls as the apparent size and orientation of their control regions change could be difficult when they typically reference the amount and/or direction of motion or occlusion within the control region. The present invention seeks to mitigate this problem as described below.

Figure 9:
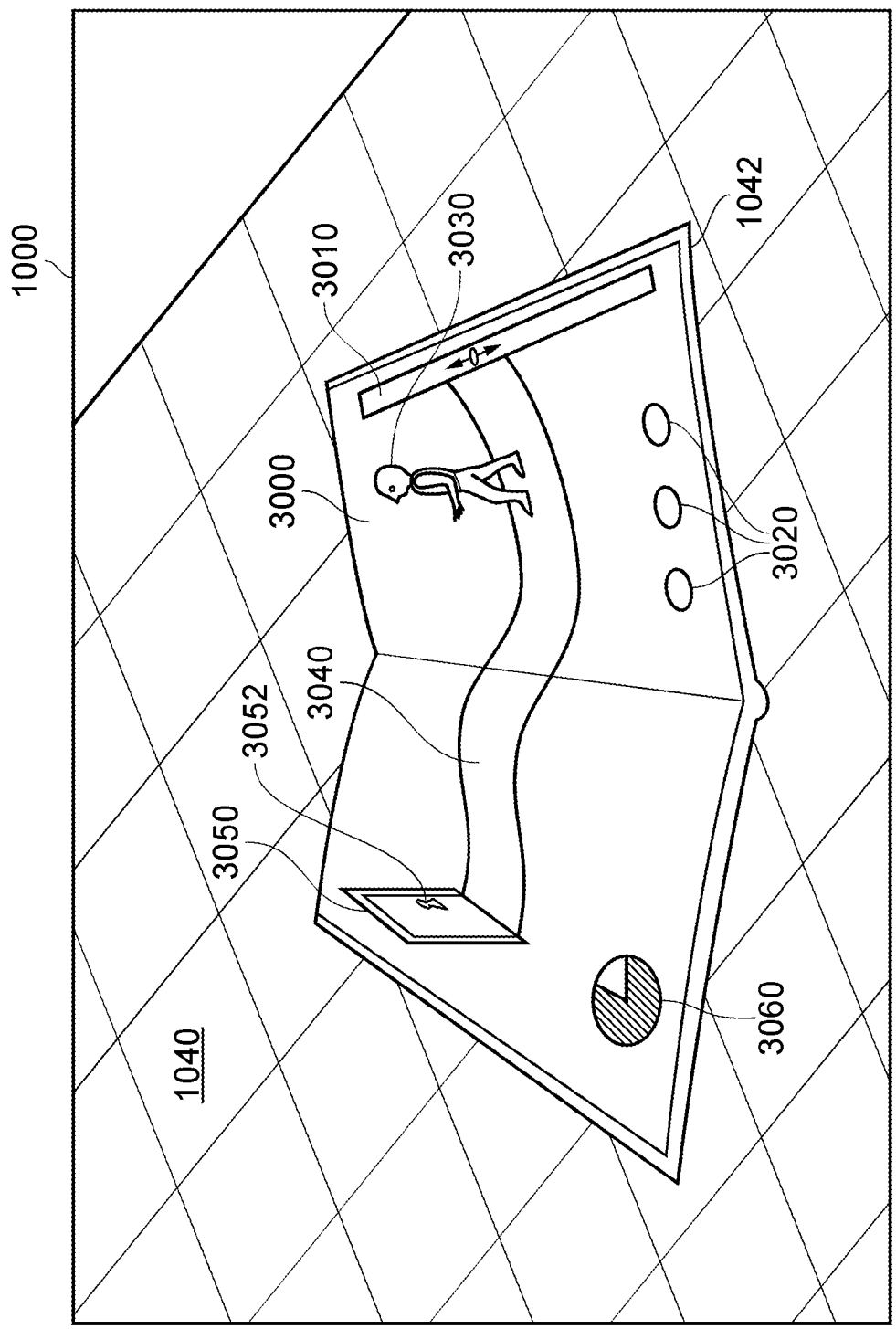
FIG. 9 is a schematic diagram of an augmented reality image.

Referring now to FIG. 9, by way of a non-limiting example for the purposes of explanation, the 'magic' book 1042 described previously with reference to FIG. 4 is now augmented with a number of 3D control interfaces.

In the captured and augmented video image 1000, the book 1042 has had a graphical augmentation image layer 3000 applied to it that comprises a plurality of control interfaces occupying regions of the augmentation image layer.

A first control interface 3010 is a slider that progresses along the length of one edge of the book, and which is angled and foreshortened to track the position of the book within the captured image. Similarly, three buttons 3020 are presented at the front of the book, and may be used for various story modes, menu selections and so forth. Again these buttons are manipulated to appear to lie on the book in conformance with the book's arbitrary, real-life positioning as measured from the video using techniques described previously.

In addition, an animated 3D character 3030 walks along a path 3040 on the book. The path may be of the virtual mousepad type described previously (for example, allowing the user to point to where they want the character to stand), and one or more elements of the character may be button inputs (for example, the hands may trigger an action menu whilst the head triggers a dialogue menu).

Similarly a further control interface 3050 resembling a door is located perpendicular to the plane of the book, again in accordance with the orientation of the book as evaluated from the captured video image. This interface may be an energy interface. A yet further interface 3052 resembling a lock is co-located with the door. This interface may be a button interface coupled to additional logic to determine ownership of a key. In this case, for example, if the user has obtained a key then they can unlock the door, but if they have not obtained the key then they must use energy (motion) to hammer it open.

Finally a feedback display 3060 is provided to indicate the current energy level applied to the door, in the manner described previously.

Thus there are nine control interfaces in the scene (slider, three buttons, character head and hand, path, door and lock), having varying sizes, orientations and modalities.

It would appear computationally difficult to represent these interfaces and maintain consistent input sensitivity from each one as the orientation of the book and the graphical elements on it changes over time.

Figure 10:
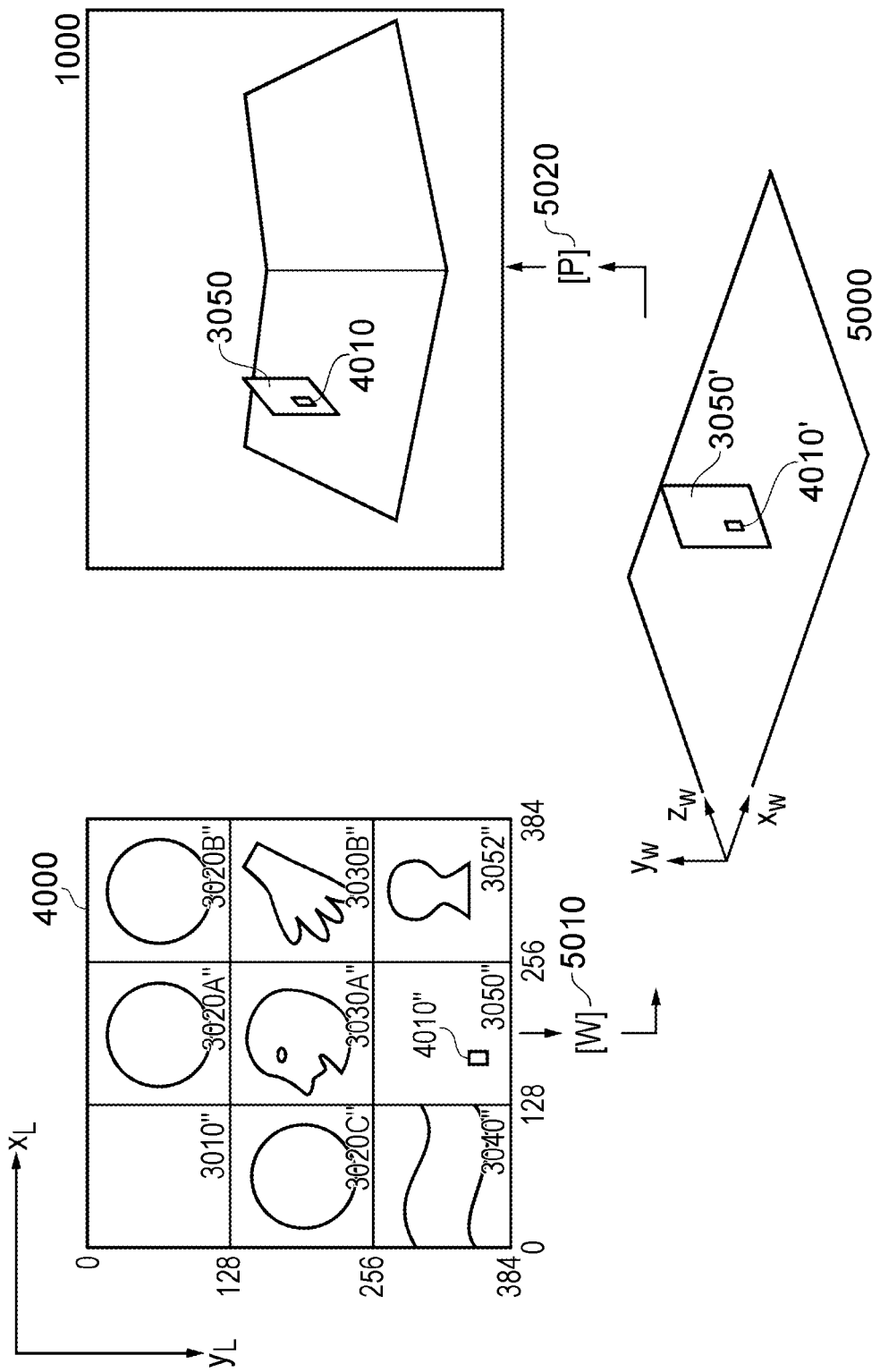
FIG. 10 is a schematic diagram of three separate spaces and mappings between them.

Referring now to FIG. 10, and using the control interface 3050 corresponding to the door as an example, in an embodiment of the present invention a consistent, 2D representation of the control interfaces is maintained in a control image 4000. The control image has a predetermined size and each of a plurality of control interfaces has a predetermined region within the control image. In FIG. 10, each of the nine control interfaces shown in FIG. 9 has a corresponding 128×128 pixel region of the control image. Thus region 3050" of the control image corresponds to control interface 3050, and so on. Thus the control image is a reference two-dimensional array of pixels having predetermined dimensions, which enables the use of two-dimensional interface input parsing techniques of the type described above by the Cell Processor.

It will be appreciated that within these areas of the control image, 2D input modes such as those described previously could be implemented with little if any modification, making input development simple and computationally efficient.

However, in order to use such inputs, it is still necessary to relate these areas of the control image to the control interfaces in the actual augmented image of the captured video.

To this end, it will be appreciated that the PS3 can map a region of a two dimensional image onto a three dimensional surface; such operations are used regularly to apply textures to virtual objects within videogame applications.

In a similar manner, the PS3 can now map an area of the control image onto the augmentation layer applied to the captured video as follows, as a preparatory step. It will be appreciated however that generally the control image is not actually used as part of the augmentation layer like a texture; the mapping is to provide information, as discussed below.

The control image 4000 has a local two dimensional co-ordinate system with axes $x_L$, $y_L$. Thus, for example, the area of the image 3050" corresponding to the door control interface 3050 occupies the region from $128x_L$, $256y_L$ to $255x_L$, $383y_L$ in the local co-ordinate system of the control image.

Generally speaking, the PS3 can calculate where a texture image should be applied within a 3D environment or 'world' 5000 to be eventually displayed in the augmentation layer. This world 3D environment has a separate three-dimensional co-ordinate system $x_W$, $y_W$, $z_W$. Similarly, the PS3 can also calculate where the area of the image 3050" corresponding to the door control interface 3050 should be within this 3D world 5000.

To this end, a world mapping function [W] 5010 applies a co-ordinate transformation that maps the pixels of the control image region 3050" to a 3D interim control area 3050'. Thus, for example, the location of a particular pixel $x_L$, $y_L$, 4010" of the control image area 3050" is transformed to a particular pixel position $x_W$, $y_W$, $z_W$ 4010' in the 3D world 5000. Thus more generally, the pixels of the control image region are mapped to an intermediate three dimensional space.

Likewise, generally the PS3 can calculate the projection (i.e. the render from a specific viewpoint) of the 3D world onto the augmentation layer, and the positioning of that layer with respect to the final augmented image comprising the captured video image. Similarly, the PS3 can also calculate the projection of the 3D interim control area 3050' onto the augmentation layer, where it forms the control interface 3050.

To this end, a projection mapping function [P] 5020 applies a co-ordinate transformation that maps the pixels of the 3D interim control area 3050' to the augmentation layer, so forming the control interface 3050. The augmentation layer (and more generally the displayed image comprising the augmented layer) has a two-dimensional co-ordinate system $x_P$, $y_P$. Thus, for example, the location of a particular pixel $x_W$, $y_W$ $z_W$ 4010' of the interim control image area 3050' is transformed to a particular position $x_P$, $y_P$ 4010 in the augmentation layer of the displayed augmented reality image.

Thus in principle the PS3 can derive mappings from an area of a control image to a control interface displayed on screen.

However, given mapping functions [W] and [P], it is then possible for the Cell Processor to compute inverse mappings $[P]^{-1}$ and $[W]^{-1}$, to map any pixel from the displayed augmented reality image back through the intermediate three dimensional space to the local co-ordinate system of the control image 4000.

In this way, if a user interacts with the augmented image, and for example the skin mask or skin motion mask intersects with pixels of a 3D control region of the augmented image, an inverse mapping can be applied to identify the corresponding pixels of the control image.

In this way, even as the 3D control region moves and changes orientation due to [W] and [P] mappings, the inputs mapped back to the corresponding control image remain substantially consistent due to the reverse $[P]^{-1}$ and $[W]^{-1}$ mappings.

To take a simple, non-limiting example, if a button control is associated with a control region 3020A of the control image, then in a first instance, if the button as displayed on the augmented reality image happens to be displayed face-on and at the same size as the control region, then the correspondence between pixels of the augmented reality image of the button and the control region of the control image will be a direct one, with pixels in the augmented reality image of the button corresponding to pixels in a similar position in the respective control region of the control image.

However, if the user moved the book so that, all else being equal, the button was now closer and so appeared twice as large, the inverse mapping would automatically map four pixels of the augmented reality image (2×2 pixels) to one pixel of the control image. Conversely if the user moved the book away so that, all else being equal, the button now appeared half the original size, then the inverse mapping would automatically map one pixel of the augmented reality image to four pixels (2×2 pixels) of the control image.

Similarly if the button was the original size but the book was rotated to that the button was viewed at an oblique angle, and was now half its height but the original width, then the inverse mapping would automatically map two vertically adjacent pixels of the button onto one pixel of the control image.

It will be understood that more generally, these changes in orientation (scale, position, rotation) happen together, and the inverse mappings relate to the resulting arbitrary changes in relative position, scale, rotation and the like.

In this way, the behaviour of the respective control region of the control image remains largely invariant despite changes that may occur to the displayed control, and the reverse mapping of the pixels of the displayed control allow the interaction seen by the user to be consistently and correctly reflected in the control functions.

Thus for example in the above case of a button, if the control function associated with the button required 50% of the button to be occluded by the user in order to activate it, the above described reverse mappings automatically scale the required number of pixels in the displayed button that need to be occluded by the user to achieve this.

It will be appreciated that as noted previously, the skin mask or skin motion mask may be calculated globally, or for part of the captured video image, or for those parts which correspond with the control interface regions of the augmented image layer. In any event, where the skin mask or skin motion mask intersects with a control interface region, the detected property of the mask for each pixel of the control interface region (e.g the skin/not skin binary classification, and/or the skin motion/not skin motion binary value) is mapped back to the control image. In other words, a detected property of the pixels of the captured video image corresponding to the pixels of the control interface region gets mapped back to the control image to act as input data to the corresponding control image region. The detected properties can thus be generally considered to be an indication of skin tone and/or an indication of a change in the indication of skin tone with respect to a previous captured image. Typically again the Cell Processor operates as an image processing means to perform these detection and mapping functions.

Thus in summary, following the above mapping and inverse processes, the Cell processor has both parts of the information used to implement fully 3D control regions for augmented reality systems.

Firstly, the forward mapping of [W] and [P] applied to the local coordinates $x_L$, $y_L$ of pixels in the control image specify where in the displayed image coordinates $x_P$, $y_P$ the control region actually is; this can be used to define a control interface region mask for the image, enabling easy comparison with the skin mask and skin motion masks described previously.

Secondly, where the skin mask and/or skin motion masks are used as a control input, or potentially some other input such as a controller steered reticule intersects with one of these control regions, the or each pixel in the control region that intersects with such inputs can be reverse mapped using $[P]^{-1}$ and $[W]^{-1}$ back from the displayed image co-ordinates $x_P y_P$ to the through the intermediate world coordinates $x_W y_W$ $z_W$ to the control image co-ordinates $x_L$, $y_L$, where the logic relating to the particular control can be applied independent of the displayed orientation of the control.

It will be appreciated that the above mappings could be derived from the mappings from graphics textures for the corresponding displayed controls. In this case the mapping [W][P] for the graphics texture gives requires an reverse mapping $[W]^{-1}[P]^{-1}[T]$ for the control region, where the further mapping [T] is the transposal of pixel positions from the graphics texture to the control region. As this is likely to be an invariate one-to-one mapping for the duration of the texture and control image, it can be calculated once and stored. Thus optionally, only part of the reverse mapping is the inverse of the mapping [W][P] when [W][P] applies to a graphics texture rather than the control image, with the additional reverse mapping [T] transposing the reverse-mapped position in the texture, (acting now as an intermediate two-dimensional array of pixels), to a corresponding position in the control image.

Optionally, so-called z-buffer data can also be used during the reverse mapping to determine whether a displayed pixel corresponds to a control region that is obscured by another virtual entity in the augmented image layer. If so, that pixel is not mapped back to the control image.

Using the above technique, the control image receives inputs to the various control regions 3010", 3020A", 3020B", 3020C", 3030A", 3030B", 3040", 3050", and 3052". These regions can then each be processed according to the relevant input modality for the displayed control.

In further embodiment however, optional refinements to the control regions may be considered.

Control regions 3010" and 3050" are simple rectangular regions of the type discussed above. However, Control regions 3020A", 3020B" and 3020C" are restricted by a circular mask. This mask corresponds to the circular buttons 3020A-C seen in the augmented image layer. The masks may be used in one or both of two ways. Firstly, the mask may be used to restrict the mapping of pixels from the control region to the augmentation image layer by use of [W][P], thereby automatically defining the corresponding input mask pixels that overlay the images of the buttons on screen. Alternatively or in addition, they can be used to restrict inputs received from the inverse mapping $[P]^{-1}$ $[W]^{-1}$ to within the circle, thus similarly limiting inputs to the region corresponding to the images of the buttons on screen. Thus more generally, inputs generated from the control regions may be based on the respective properties of a restricted set of pixels within the control regions.

Similarly, control regions 3040" and 3052" include masks that may be mapped to generate input masks for the augmented image layer, and/or may be used to filter inputs generated with respect to the augmented image layer. In this case it will be appreciated from FIG. 9 that the scaling, rotation and orientation of each mask can be independent, so that the path shaped mask of control region 3040" is scaled up to correspond to a significant portion of the augmented image layer, whilst the lock shaped mask of control region 3052" is scaled down to correspond to a very small portion of the augmented image layer.

It will be appreciated that the path shaped control region 3040" may be implemented as for example two regions, one for each page of the book. This could provide flexibility for the purposes or story telling, or to simplify rendering of the book depending on implementation. For many of the input modalities listed above this does not cause any problems; however for velocity or acceleration inputs, it would be desirable to provide continuity between the control regions. This can be done in a first instance by logically linking the relevant control regions so that, for example, a velocity value for a first linked control region is passed to a second linked control region as the user's input progresses along the path. Alternatively or in addition, the separate regions of the path can also be mapped to a single control region so as to provide continuity for such measurements. Thus more generally, the control image can contain a plurality of control image regions that each receives input from respective control interface regions of the augmented image layer, and/or a plurality of the control interface regions of the augmented image layer may be mapped to one control image region. Moreover, a plurality of control image regions may be logically linked to function as a single, larger control image region as described above.

Finally, control regions 3030A" and 3030B" illustrate that the masks can themselves change with each image frame; i.e. they can be animated over successive augmented image layers to correspond to animated graphical elements of the augmented image layer. Such a mask can be generated in parallel to its corresponding animated graphical element, or can be derived from it, for example by applying a threshold to the alpha channel values of the animated graphical element (i.e. base the mask on non-transparent elements of the animated graphical element). Other techniques will be apparent to the person skilled in the art.

In this way, the controls and their input masks can adopt fixed or animated arbitrary shapes within a rendered 3D augmented reality environment.

In an embodiment of the present invention, one or more additional functions can make use of the forward and reverse mapping features described herein.

For example, if the user places a coin on the WonderBook, that coin can be identified using similar techniques to the skin identification described above, and the image of the coin can be mapped from the book to a prescribed texture space. The mapping automatically compensates for the orientation of the coin on the book, giving it a regular, face-on appearance, as described previously herein. The coin texture can then be applied to a stored 3D coin model, or alternatively the texture can be extruded (for example by a fixed percentage of its diameter) to form a new 3D coin model.

The PS3 can then generate an augmentation layer in which hides the real image of the coin and animates the 3D model of the coin in its place, enabling a real object to apparently enter the virtual world of the book.

In a similar manner, a user may place a photograph or other picture on a page of the book, or the book may include a picture on a page, the this picture can be identified and mapped to a prescribed texture space in a similar manner to the coin, and then mapped back to overlay the original version of the picture in the displayed augmented image. In this case, the picture is also defined as an input region, and user interactions with the input region can be detected as described previously and used to modify the texture. For example, the if the user touches the picture, ripples could be applied to the texture and mapped back to the augmented image so that the picture looks as though it is made of water; other options include the ability to rub the picture out with a finger, or smear it or change colours, or if the original picture is black and white, to paint new colours in with reference to a colour version of the picture accessible by the PS3.

Figure 11:
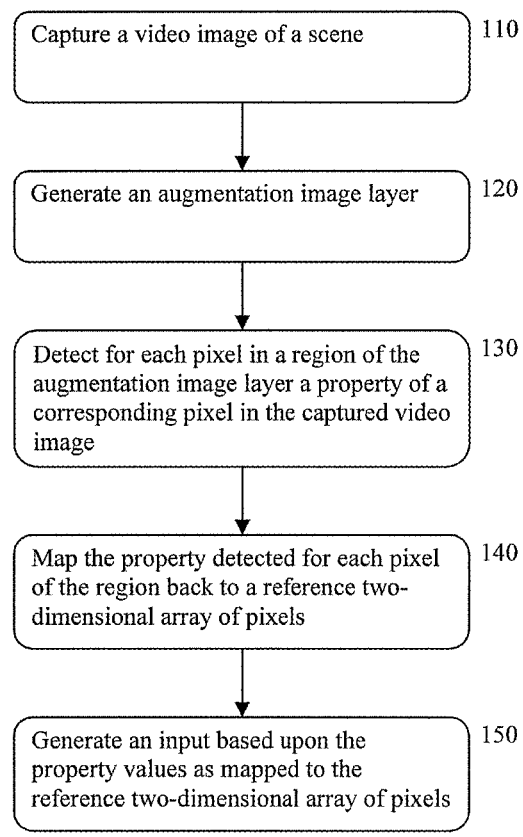
FIG. 11 is a flow diagram of a method of input processing for an augmented reality system.

Referring now to FIG. 11, a corresponding summary method of input processing for an augmented reality system comprises in a first step 110, capturing a video image;

in a second step s120, generating an augmented image layer for integration with the captured video image, and for a region of the augmented image layer, in a third step s130, detecting for each pixel in the region a property of a corresponding pixel in the captured video image, and in a fourth step s140, mapping with a first mapping the property detected for each pixel of the region back to a reference two-dimensional array of pixels;

and then in a fifth step, generating an input based upon the property values as mapped to the reference two-dimensional array of pixels.

It will be apparent to a person skilled in the art that variations in the above method corresponding to operation of the various embodiments of the apparatus and to the various embodiments of the techniques as described and claimed herein are considered within the scope of the present invention.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a computer program product or similar object of manufacture comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of input processing for augmented reality, comprising the steps of:
    capturing a video image of a scene comprising a poseable object;
    generating an augmented image layer for superposition over the captured video image, the image augmentation layer comprising a region depicting a control interface whose position and orientation is dependent upon the position and orientation of the poseable object in the captured video image; and
    the region of the augmented image layer being defined by mapping with a second mapping a region of a reference two-dimensional array of pixels into an intermediate three dimensional space at a position and orientation dependent upon the position and orientation of the poseable object in the captured video image, and thereafter the second mapping projecting the mapped pixels onto the image augmentation layer,
    detecting for each pixel in the region a property of a corresponding pixel in the captured video image, and
    mapping, with a first mapping that is at least in part an inverse of the second mapping, the property detected for each pixel of the region to the reference two-dimensional array of pixels;
    generating an input to a data process based upon the property values as mapped to the reference two-dimensional array of pixels.

2. A method according to claim 1, wherein the step of mapping with the first mapping comprises mapping each pixel from the captured video image back to the reference two-dimensional array of pixels through the intermediate three dimensional space.

3. A method according to claim 1 in which the region of the reference two-dimensional array of pixels is restricted by a mask so that input data is generated based upon the respective property values of a restricted set of the reference two-dimensional array of pixels.

4. A method according to claim 3 in which the mask is animated over successive augmented image layers corresponding to successive captured video images.

5. A method according to claim 1 in which the first mapping further comprises a transposition from an intermediate two-dimensional array of pixels to the reference two-dimensional array of pixels.

6. A method according to claim 1 in which the reference two-dimensional array of pixels comprises a plurality of regions, and an input is generated from property values as mapped to each region.

7. A method according to claim 1, in which the augmented image layer comprises a plurality of regions, and a corresponding plurality of regions of the captured video image are mapped to one region of the reference two-dimensional array of pixels.

8. A method according to claim 1, in which the property of a corresponding pixel in the captured video image is an indication of skin tone.

9. A method according to claim 1, in which the property of a corresponding pixel in the captured video image is an indication a change in an indication of skin tone with respect to a preceding captured video image.

10. A method according to claim 1, comprising the step of mapping an element of the video image with the first mapping to a prescribed array of pixels as a texture, and the texture is applied to a three dimensional object in the augmented image layer.

11. A method according to claim 1, comprising the step of mapping an element of the video image with the first mapping to a reference array of pixels as a texture, modifying the texture, and mapping the texture with the second mapping on to the augmented image layer.

12. A computer program product comprising a non-transitory computer readable medium on which computer readable instructions of a computer program are stored, the instructions, when executed by a processor, cause the processor to perform a method of input processing for augmented reality according to claim 1.

13. An entertainment device, comprising:
    video input means operable to receive a captured video image of a scene comprising a poseable object;
    image augmentation means operable to generate an augmented image layer for superposition over the captured video image, the image augmentation layer comprising a region depicting a control interface whose position and orientation is dependent upon the position and orientation of the poseable object in the captured video image;
    image processing means operable, for the region of the augmented image layer that is defined by mapping with a second mapping a region of a reference two-dimensional array of pixels into an intermediate three dimensional space at a position and orientation dependent upon the position and orientation of the poseable object in the captured video image, and thereafter the second mapping projecting the mapped pixels onto the image augmentation layer, to
    detect for each pixel in the region a property of a corresponding pixel in the captured video image, and
    map, with a first mapping that is at least in part an inverse of the second mapping, the property detected for each pixel of the region to the reference two-dimensional array of pixels; and
    input parsing means operable to generate an input to a data process based upon the property values as mapped to the reference two-dimensional array of pixels.

14. An entertainment device according to claim 13, in which the image processing means is operable to map, with the first mapping, the property detected for each pixel of the region back to the reference two-dimensional array of pixels through the intermediate three dimensional space.

* * * * *